(12) United States Patent
Goodman et al.

(10) Patent No.: US 8,510,466 B2
(45) Date of Patent: Aug. 13, 2013

(54) BYPASSING AN APPLICATION LAYER GATEWAY

(75) Inventors: Lee N Goodman, Tyngsboro, MA (US); James Flynn, Stoughton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 347 days.

(21) Appl. No.: 12/041,027

(22) Filed: Mar. 3, 2008

(65) Prior Publication Data

US 2009/0222577 A1   Sep. 3, 2009

(51) Int. Cl.
  *G06F 15/173* (2006.01)
(52) U.S. Cl.
  USPC ......................................................... 709/238
(58) Field of Classification Search
  USPC ......................................................... 709/238
  See application file for complete search history.

(56) References Cited

U.S. PATENT DOCUMENTS

| | | | | |
|---|---|---|---|---|
| 6,523,068 | B1 * | 2/2003 | Beser et al. | 709/238 |
| 7,441,043 | B1 * | 10/2008 | Henry et al. | 709/238 |
| 7,480,938 | B2 * | 1/2009 | Minnig et al. | 726/12 |
| 7,561,575 | B2 * | 7/2009 | Biswas et al. | 370/392 |
| 7,610,393 | B1 * | 10/2009 | Chen et al. | 709/230 |
| 7,624,195 | B1 * | 11/2009 | Biswas et al. | 709/245 |
| 7,693,132 | B1 * | 4/2010 | Cooper et al. | 370/352 |
| 8,019,889 | B1 * | 9/2011 | Biswas et al. | 709/245 |
| 2001/0043571 | A1 * | 11/2001 | Jang et al. | 370/260 |
| 2002/0133534 | A1 * | 9/2002 | Forslow | 709/200 |
| 2003/0053427 | A1 * | 3/2003 | Kanda et al. | 370/328 |
| 2004/0246991 | A1 * | 12/2004 | Tsuzuki et al. | 370/466 |
| 2006/0067318 | A1 * | 3/2006 | Gorodetsky et al. | 370/392 |
| 2006/0182128 | A1 * | 8/2006 | Nakata et al. | 370/401 |
| 2007/0140267 | A1 * | 6/2007 | Yang | 370/401 |
| 2008/0062978 | A1 * | 3/2008 | Hwang et al. | 370/389 |
| 2009/0077668 | A1 * | 3/2009 | Noghanian et al. | 726/26 |
| 2009/0238080 | A1 * | 9/2009 | Hirano et al. | 370/241 |
| 2010/0005288 | A1 * | 1/2010 | Rao et al. | 713/151 |
| 2010/0020792 | A1 * | 1/2010 | Mitchell et al. | 370/352 |
| 2010/0172359 | A1 * | 7/2010 | Pande et al. | 370/401 |

\* cited by examiner

*Primary Examiner* — Steven H Nguyen
*Assistant Examiner* — Saad A Waqas

(57) ABSTRACT

A device may include a client configured to select a network address that an application layer gateway does not recognize, create a message that includes the selected network address as a source address of the message and excludes any address that the application layer gateway will overwrite when the application layer gateway receives the message, and send the message from within a private network through a router to a remote device outside the private network.

20 Claims, 11 Drawing Sheets

US 8,510,466 B2

BYPASSING AN APPLICATION LAYER GATEWAY

BACKGROUND

A firewall or a network address translator (NAT) that is interposed between a private network and a public network may protect the private network against intrusion or attacks. The firewall may regulate a flow of network traffic between the private network and the public network based on packet characteristics, such as source network addresses, destination network addresses, port numbers, etc. The NAT may rewrite source addresses and port numbers of outgoing packets that originate from within the private network.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION

The following detailed description refers to the accompanying drawings. The same reference numbers in different drawings may identify the same or similar elements. Depending on the context, the terms "message" or "packet," as used herein, may refer to one or more packets, datagram, cells; fragments of one or more packets, datagrams or cells; or other types of data or data units.

In the descriptions that follow, a client application may send messages that bypass an application layer gateway (ALG) that is hosted on a router. In normal operation, the router, which is located between the private network and an outside network, and the ALG hosted on the router may provide the private network with its own network address space and may protect the private network from security violations and/or intrusions from the outside network.

In some implementations, however, the ALG may malfunction and incorrectly modify contents of valid packets. In such instances, the client application may send messages and/or packets that bypass the ALG.

Figure 1A:
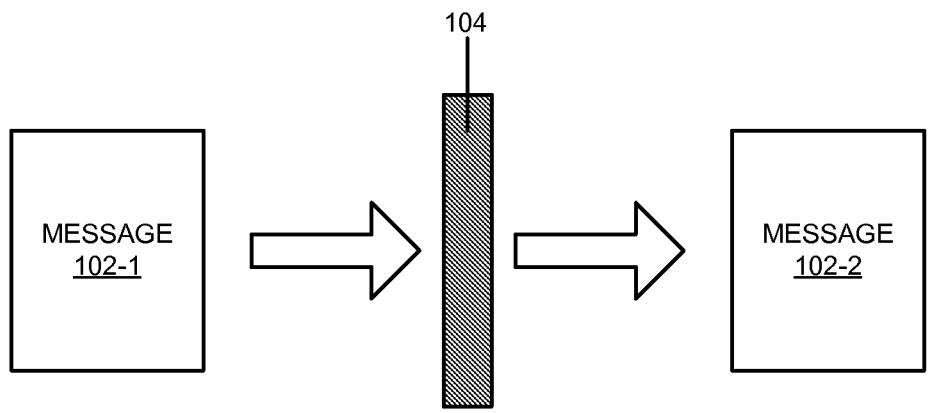
FIGS. 1A and 1B illustrate a message that may bypass an exemplary application layer gateway (AGL)
Figure 1B:
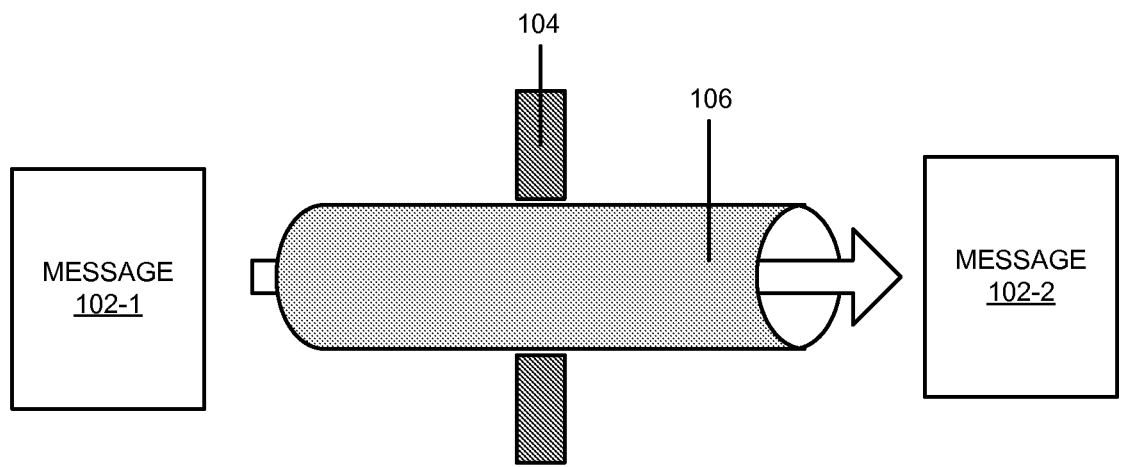

FIGS. 1A and 1B conceptually illustrate sending a message that may bypass an ALG 104. In FIG. 1A, message 102-1 and message 102-2 may represent a message 102 before and after message 102 passes through ALG 104. In general, ALG 104 may inspect and modify messages whose body includes network addresses that are within specific ranges. However, when the body of message 102 does not include a network address that is within the specific ranges, the message may bypass ALG 104. In FIG. 1B, message 102 may pass through a tunnel 106 between the client application and an endpoint. ALG 104 may not recognize messages that are transported via tunnel 106, and, therefore, message 102 may bypass ALG 104.

Figure 2:
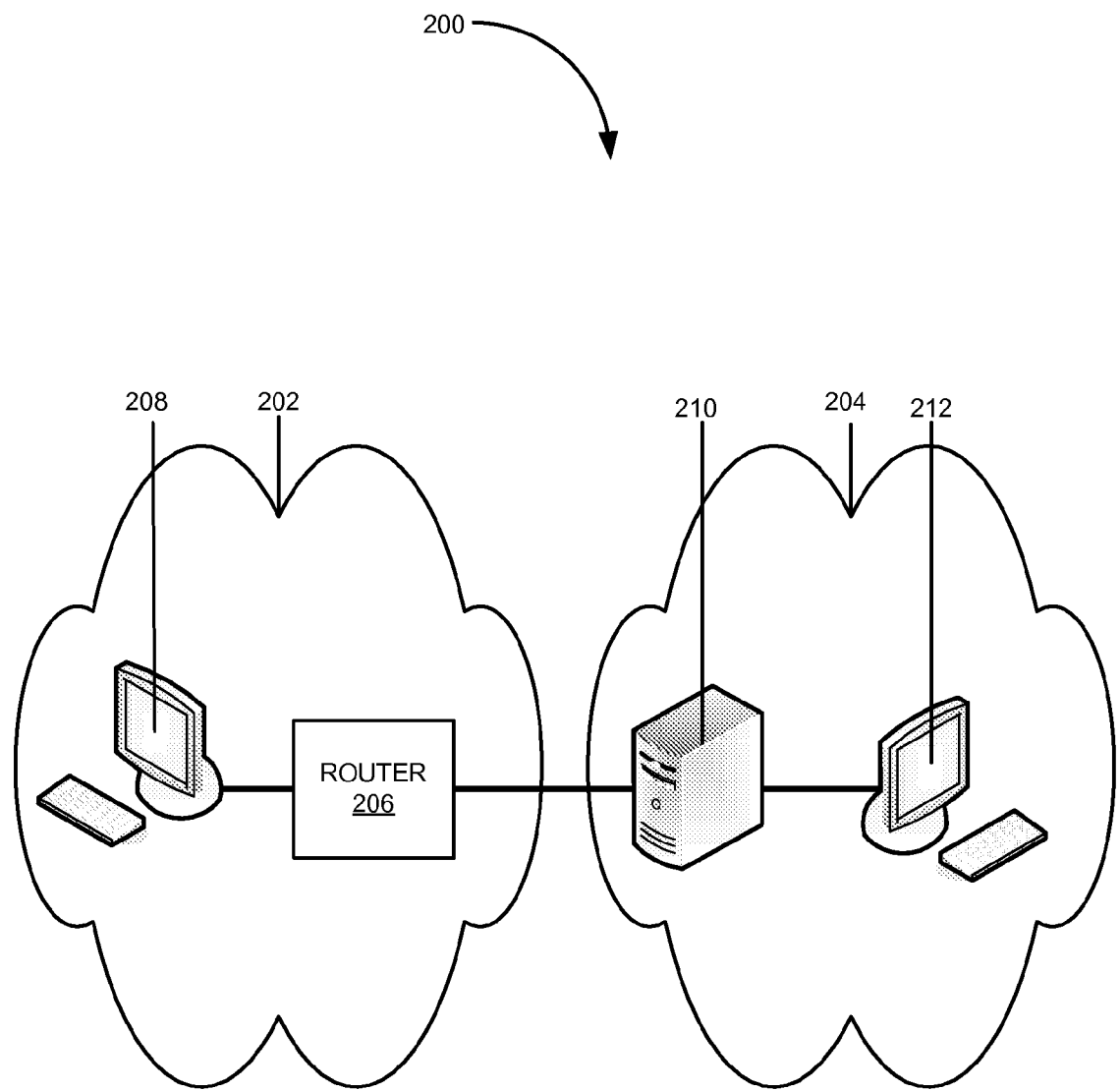
FIG. 2 illustrates an exemplary network in which concepts described herein may be implemented.

FIG. 2 is a diagram of an exemplary network 200 in which concepts described herein may be implemented. As shown, network 200 may include a private network 202 and an outside network 204. Private network 202 may include an intranet, a local area network (LAN), a wireless LAN (WLAN), a home-based network, a personal area network (PAN), a wireless PAN, or a combination of networks. Outside network 204 may include one or more private networks, a wide area network (WAN), a metropolitan area network (MAN), a cellular network, a public switched telephone network (PSTN), the Internet, any other network, or a combination of networks.

As further shown, private network 202 may include a router 206 and a client device 208. Depending on the implementation, private network 202 may include fewer, additional, or different devices than those illustrated in FIG. 1. For example, private network 202 may include additional client devices, such as a number of computing devices (e.g., personal computers (PCs), laptops, etc.), an Internet phone, a networked multimedia device (e.g., a television), etc.

Router 206 may include mechanisms for modifying network addresses of packets that flow in or out of private network 202 and for protecting private network 202 against unauthorized egress/ingress of packets from private network 202/outside network 204. Client device 208 may host an application (e.g., an Internet soft phone, an instant messenger client, an email client, etc.) that may depend on communication between devices in private network 202 and devices in outside network 204.

Outside network 204 may include session border controller (SBC) 210 and a client device 212. SBC 210 may provide for signaling as well as a set up, maintenance, and/or tear down of media channels, such as Voice-over-Internet-Protocol (VoIP) sessions, video streams, instant messaging sessions, etc. Client device 212 may host an application that communicates with the application on client device 208.

Figure 3:
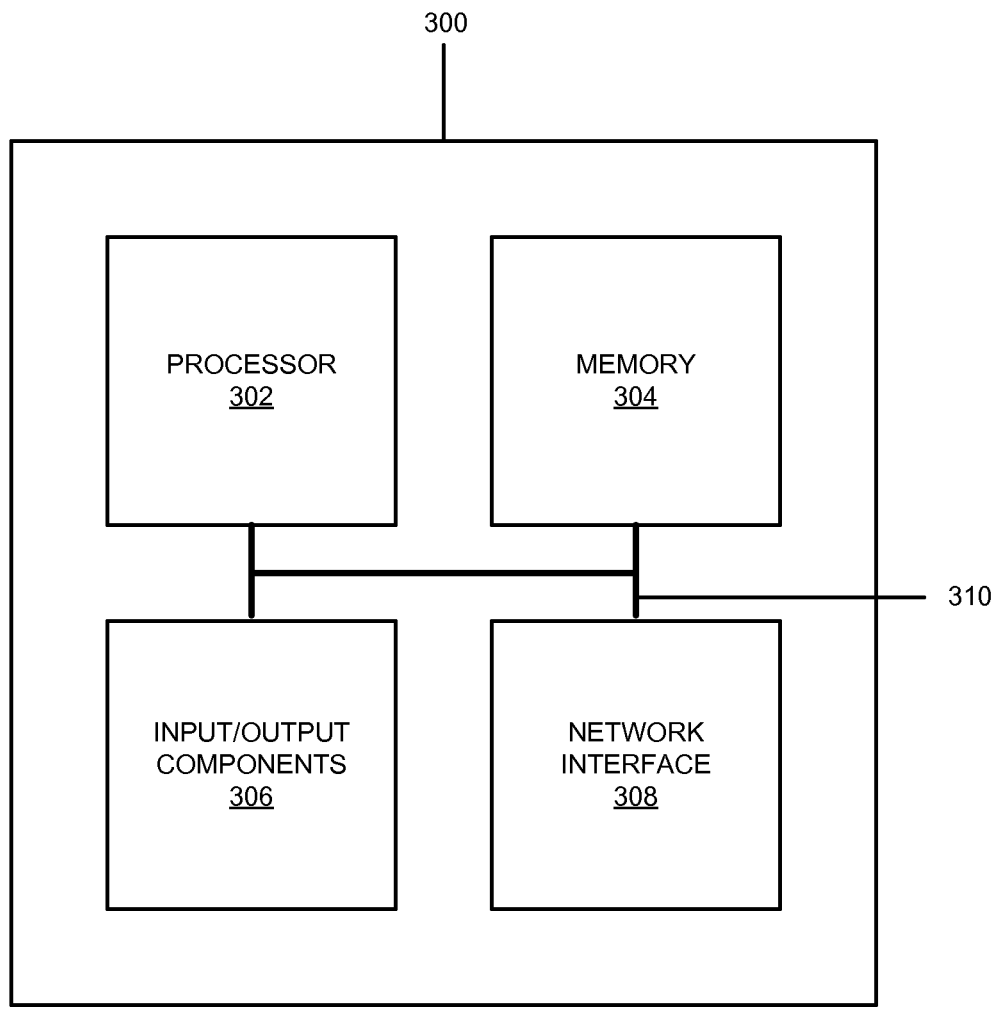
FIG. 3 is a block diagram of exemplary devices in FIG. 2.

FIG. 3 is a block diagram of a network device 300, which may correspond to router 206, client device 208, SBC 210, or client device 212. As shown, network device 300 may include a processor 302, a memory 304, input/output components 306, a network interface 308, and a communication path 310. In different implementations, network device 300 may include additional, fewer, or different components than the ones illustrated in FIG. 3. For example, network device 300 may include additional line interfaces, such as interfaces for receiving and forwarding packets.

Processor 302 may include a processor, a microprocessor, an Application Specific Integrated Circuit (ASIC), a Field Programmable Gate Array (FPGA), and/or other processing logic capable of controlling network device 300. Memory 304 may include static memory, such as read only memory (ROM), and/or dynamic memory, such as random access memory (RAM), or onboard cache, for storing data and machine-readable instructions. Memory 304 may also include storage devices, such as a floppy disk, CD ROM, CD read/write (R/W) disc, and/or flash memory, as well as other types of storage devices.

Input/output components 306 may include a display screen, a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to network device 300.

Network interface 308 may include any transceiver-like mechanism that enables network device 300 to communicate with other devices and/or systems. For example, network interface 308 may include mechanisms for communicating via a network, such as the Internet, a terrestrial wireless network (e.g., a WLAN), a satellite-based network, a WPAN, etc. Additionally or alternatively, network interface 308 may include a modem, an Ethernet interface to a LAN, and/or an interface/connection for connecting network device 300 to other devices (e.g., a Bluetooth interface).

Communication path 310 may provide an interface through which components of network device 300 can communicate with one another.

Figure 4:
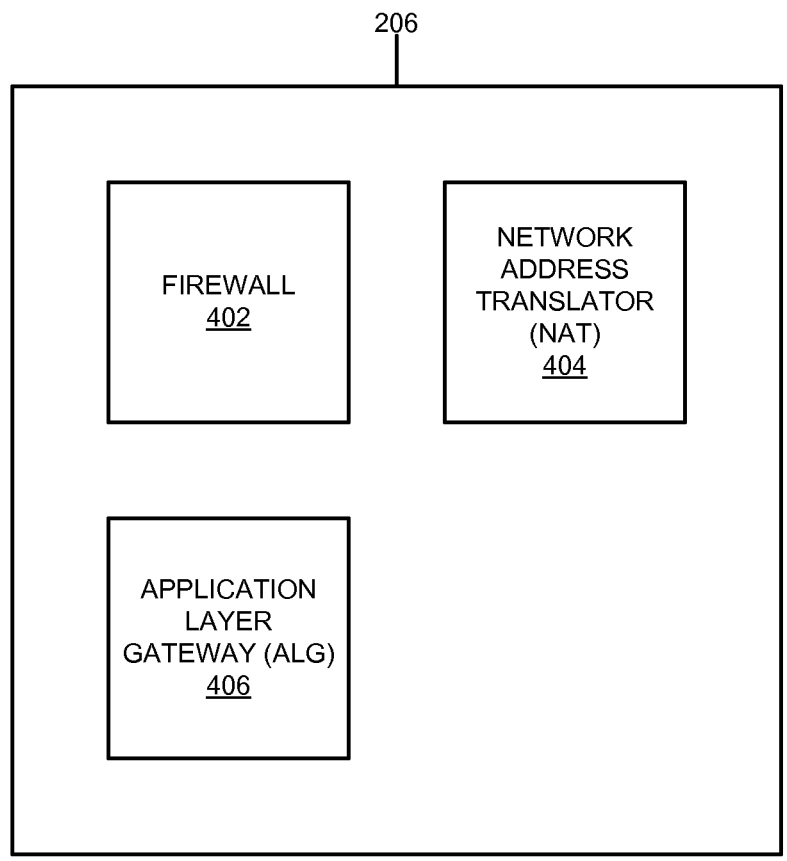
FIG. 4 is a functional block diagram of an exemplary router in FIG. 2.

FIG. 4 is a functional block diagram of router 206. As shown, router 206 may include a firewall 402, a network address translator (NAT) 404, and an application layer gateway (ALG) 406. Although not shown in FIG. 4, router 206 may include additional components, such as, for example, the components in network device 300, a routing engine, an operating system, etc. As further explained below, ALG 406, which is installed to correct problems that may be introduced by NAT 404, may sometimes incorrectly modify valid packets that arrive at router 206.

Firewall 402 may include hardware/software components for permitting or denying a packet from entering and/or exiting private network 202. In permitting or denying ingress/egress of a packet into/out of private network 202, firewall 402 may enforce rules that are related to source/destination addresses, port numbers, protocols, etc., of the packet. For example, firewall 402 may prevent a packet whose header contains a specific source address from entering private network 202.

NAT 404 may include hardware/software components for rewriting a source address and/or a port number within a header of packet leaving private network 202. Such a translation of an internal address/port number of a packet from private network 202 may render internal addresses of private network 202 indeterminable or invisible to devices in outside network 204.

Figure 5A:
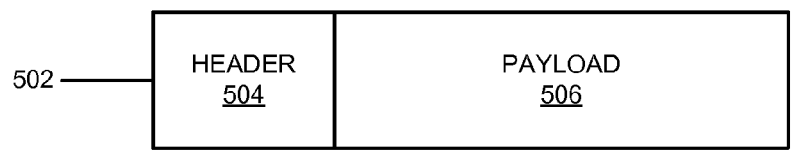
FIG. 5A depicts an exemplary packet.

FIG. 5A is a block diagram of an exemplary packet 502 that may leave private network 202 via NAT 404. As shown, packet 502 may include a header 504 (e.g., an Open Systems Interconnection (OSI) Model layer 3 header) and a payload 506. Packet 502 may include additional headers (e.g., a layer 2 header) or other types of information, although they are not illustrated in FIG. 5A. Header 504 may include addresses, such as a source Internet Protocol (IP) address, a destination IP address, a source port number, a destination port number, etc. Payload 506 may include data that is carried by packet 502.

Figure 5B:
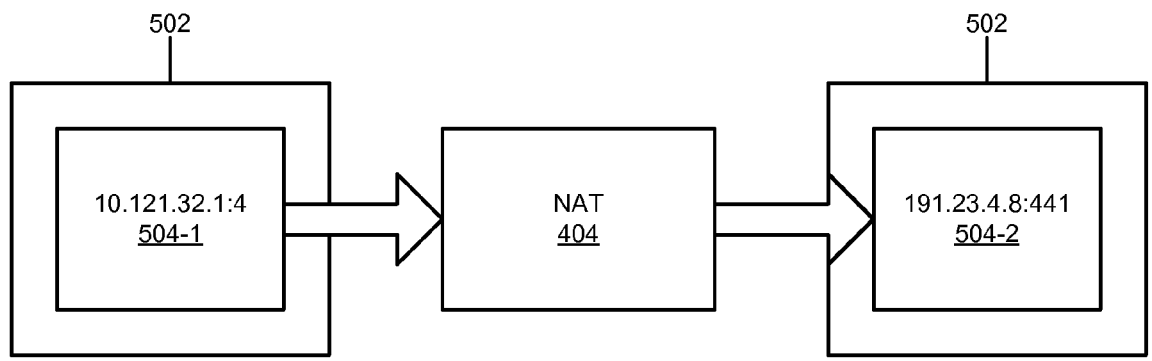
FIG. 5B is a conceptual flow diagram illustrating how a source network address and a port number of a header of the exemplary packet of FIG. 5A may be translated by an exemplary network address translator (NAT) of FIG. 4 as the packet passes through the NAT.

FIG. 5B illustrates how a source network address and a port number in header 504 may be translated by NAT 404. As shown, before packet 502 enters NAT 404 from within private network 202, packet 502 may include a header 504-1 with a particular network address and a port number (e.g., 10.121.32.1:4). After the network address and the port number are translated, packet 502 may include header 504-2, with a different network address and port number (e.g., 191.23.4.8:441).

Returning to FIG. 4, ALG 406 may include hardware/software components for correcting network address translation errors that may be introduced by NAT 404. As illustrated above, NAT 404 may translate packet 502's source address and port number by modifying packet header 504. However, if packet 502 includes a local source address and/or a port number in payload 506, NAT 404 may produce a defective packet, as NAT 404 may not translate the source address and/or the port number in payload 506. As a result, the network addresses that are included in payload 506 may no longer match the addresses in header 504. To correctly translate the network addresses, ALG 406 may update the addresses in payload 506.

Figure 5C:
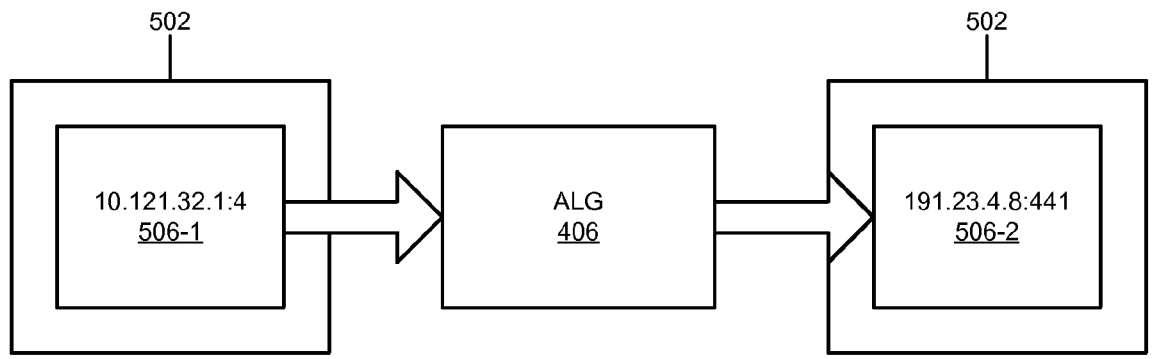
FIG. 5C is a conceptual flow diagram illustrating how a source network address and a port number of a message within a payload of the exemplary packet of FIG. 5A may be translated by an ALG of FIG. 4 as the packet passes through the ALG.

FIG. 5C illustrates how a source network address and a port number in payload 506 may be translated by ALG 406. As shown, before packet 502 enters ALG 406 from within private network 202, packet 502 may include a payload 506-1 including particular a network address and port number (e.g., 10.121.32.1:4). After packet 502 enters ALG 406, ALG 406 may determine if the network address in payload 506-1 is within specific ranges of addresses that are managed by ALG 406. If the network address and the port number are within the ranges, ALG 406 may rewrite occurrences of the network address in payload 506-1 (to, e.g., 191.23.4.8:441) so that payload 506-2 may no longer include defective source addresses.

If ALG 406 is not correctly implemented or has malfunctioned, ALG 406 may not correctly rewrite source addresses that are embedded in payload 506. In such instances, applications may send messages or packets that bypass ALG 406's influence.

Figure 6:
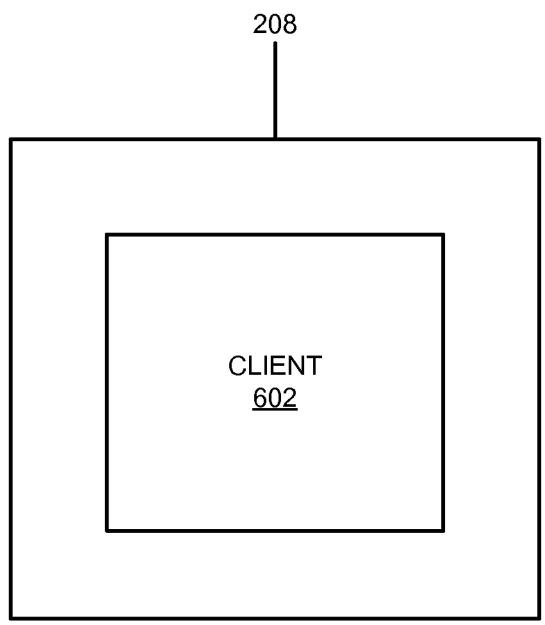
FIG. 6 is a functional block diagram of an exemplary client device of FIG. 2.

FIG. 6 is a functional block diagram of exemplary client device 208. As shown, client device 208 may include a client 602. Depending on the implementation, client device 208 may include additional components, such as the components in network device 300, an operating system (e.g., Linux, Windows, etc.), an application (e.g., an email client), etc.

Client 602 may include hardware/software for providing a specific set of tasks or functionalities that are related to communicating between client 602 and other clients (e.g., an IP phone client). In some implementations, client 602 may determine whether ALG 406 hosted on router 406 is operating correctly, and may provide mechanisms for transmitting packets that bypass ALG 406 when it is determined that ALG 406 is not operating correctly.

Figure 7A:
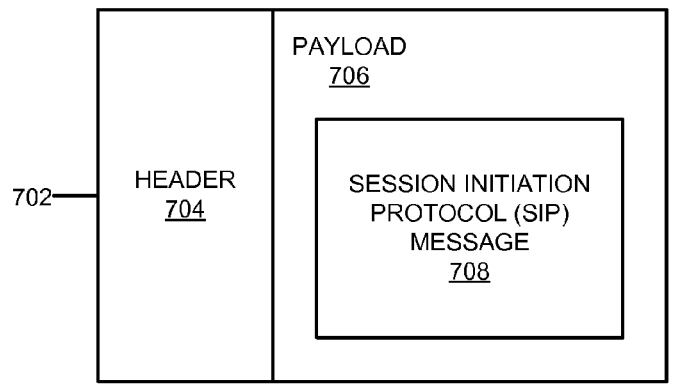
FIG. 7A depicts an exemplary packet that carries an exemplary session initiation protocol (SIP) message.

In one implementation, client 602 may generate a packet that bypasses ALG 406. The packet may carry, for example in its payload, a message with addresses that ALG 406 does not manage and/or recognize. FIG. 7A shows an exemplary packet 702 that may bypass ALG 406. As shown, packet 702 may include a header 704 and a payload 706. Header 704 may include addresses (e.g., source and destination addresses). Payload 706 may include data, such as a SIP message 708.

Figure 7B:
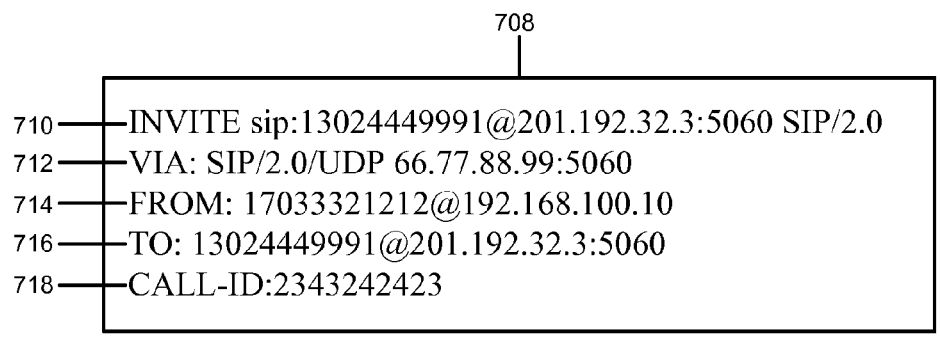
FIG. 7B is a conceptual flow diagram illustrating a portion of the exemplary SIP message that may be created by an exemplary client of FIG. 6.

FIG. 7B illustrates a portion of exemplary SIP message 708. As shown, SIP message 708 may include a TYPE field 710, VIA field 712, FROM field 714, TO field 716, and CALL-ID field 718. While not shown in FIG. 7B, SIP message 708 may include additional, fewer, and/or different fields, such as a sequence number field.

TYPE field 710 may include an identifier for a specific type of SIP message (e.g., an INVITE message, a REGISTER message, an ACK message, etc.). Each type of message may signal a specific request, an acknowledgment of a request, and/or a state associated with a client. For example, an INVITE message may request another client to participate in a phone call, a SIP 200 OK message may indicate that a phone associated with the call has been picked up by a recipient, etc. VIA field 712 may include address information associated with a proxy or a device that is designated to deliver message 708. FROM field 714 and TO field 716 may include a source address (e.g., a domain name, an IP address, etc.) of the sender and a destination address of the recipient, respectively. CALL-ID field 718 may identify a call or a session that is associated with SIP message 708.

In creating SIP message 708 in a manner consistent with embodiments described herein, client 602 may rewrite the source network address and a port number of SIP message 708 to include a source network address and a port number that are not managed by ALG 406. For example, assume that ALG 406 manages addresses that are in range 192.168.22.x. In writing SIP message 708, client 602 may insert 192.168.100.10 in FROM field 714 in place of the actual address of client device 208.

Figure 7C:
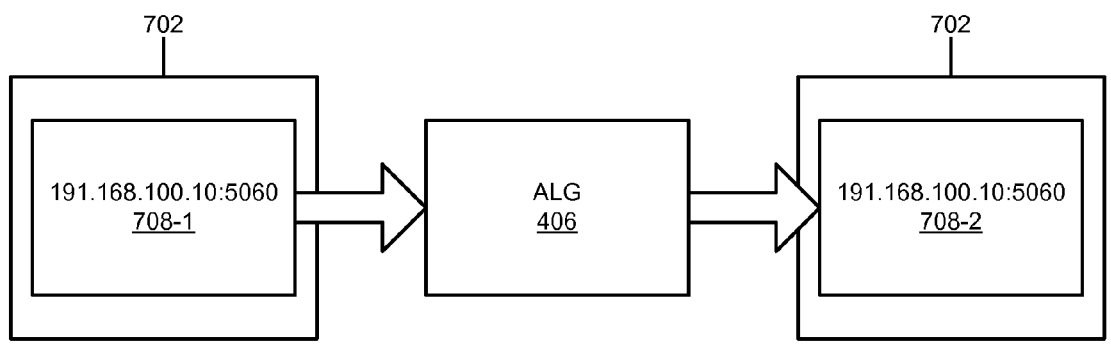
FIG. 7C is a conceptual flow diagram illustrating the exemplary SIP message of FIG. 7B passing through the exemplary ALG of FIG. 4.

FIG. 7C conceptually illustrates how SIP message 708 may passes through ALG 406 when address 192.168.100.10 is inserted in FROM field 714. As shown, SIP message 708-1 and SIP message 708-2 illustrate SIP message 708 before and after SIP message 708 passes through ALG 406. As further shown, network address 192.168.100.10 in SIP message 708-1 is unchanged in SIP message 708-2.

Figure 8A:
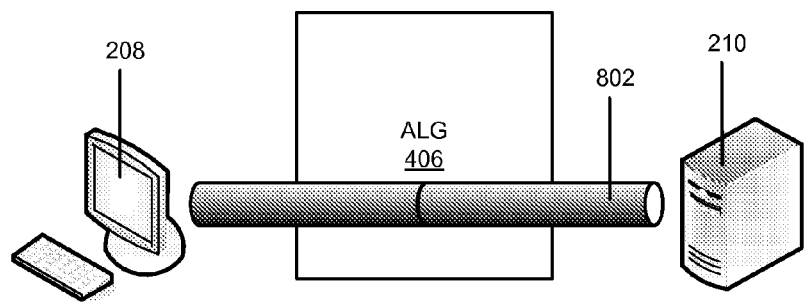
FIG. 8A depicts an exemplary Internet Protocol (IP) Security (IPSec) tunnel between the exemplary client device of FIG. 2 and an exemplary Session Border Controller (SBC) of FIG. 2.

In a different implementation, client 602 may send messages that bypass ALG 406 by establishing a tunnel and by sending the messages through the tunnel. FIG. 8A depicts an exemplary IPSec tunnel 802 between client device 208 and SBC 210. IPSec tunnel 802 may shield data that is being carried within IPSec tunnel 802 from being inspected by a network device or component, such as ALG 406. To prevent ALG 406 from modifying the contents of a SIP message, client 602 may establish IPSec tunnel 802 between client device 208 and SBC 210 and may send packets that carry the SIP message to SBC 210 through IPSec tunnel 802.

Figure 8B:
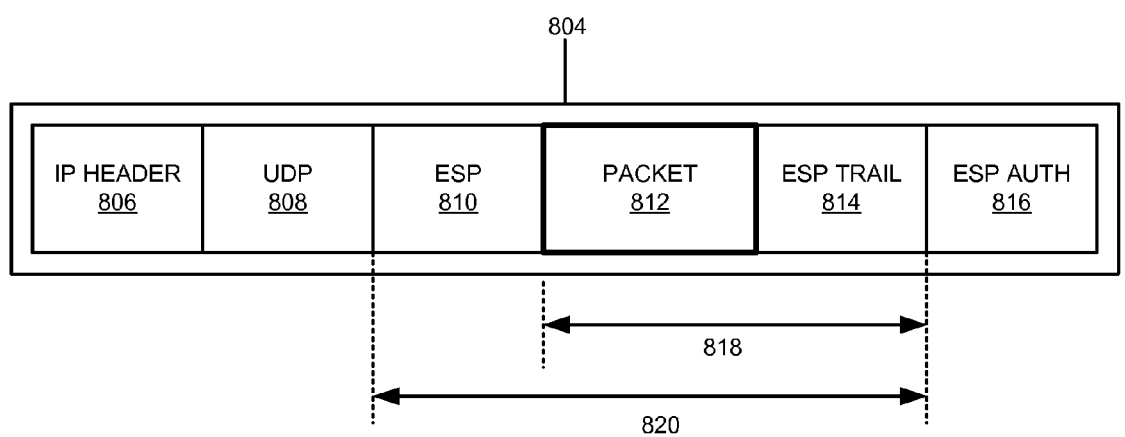
FIG. 8B depicts an exemplary packet that may be placed inside a user datagram protocol (UDP) packet for IPSec tunneling.

FIG. 8B shows a packet 812 that is sent through IPSec tunnel 802. As shown, tunneling packet 812 may entail encapsulating packet 812 inside a user datagram protocol (UDP) packet 804. As further shown, UDP packet 804 may include an IP header 806, a UDP header 808, Encapsulation Security Payload (ESP) header 810, IP packet 812, ESP trail 814, and ESP authentication data 816. IP header 806 may include Internet Protocol and/or packet related information, such as an IP version, the header length, the total length of packet 804, time to live, a source address, a destination address, etc. UDP header 808 may include information that is related to UDP, such as a source port number, a destination port number, a checksum, length, etc. ESP header 810 may include security related information such as a message sequence number, a security parameters index, etc. IP packet 812 may include a packet that contains a message, such as SIP message 708 (FIG. 7A). ESP trail 814 and ESP authentication data 816 may include padding, a padding length, authentication data (e.g., data used for authenticating an ESP packet (e.g., ESP header 810+packet 812+ESP trail 814).

In one exemplary implementation, portion 818 of UDP packet 804 (e.g., IP packet 812 and ESP trail 814) may be encrypted, and portion 820 of UDP packet 804 (e.g., ESP header 810, IP packet 812, and ESP trail 814) may be authenticated.

In FIG. 8B, because a SIP message may be part of the payload of packet 812, which is encrypted, ALG 406 may be unable to recognize address information that is embedded in the SIP message. Consequently, ALG 406 may not modify SIP messages that are carried via IPSec tunnel 802.

Figure 9A:
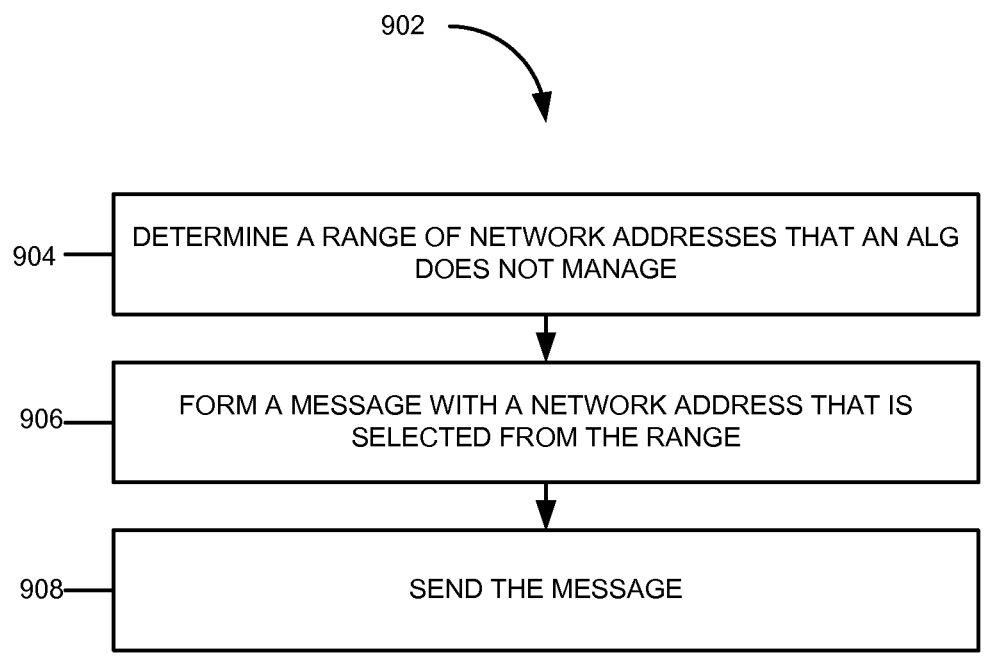
FIGS. 9A and 9B are flow diagrams of exemplary processes for sending a message that bypasses the ALG of FIG. 4.
Figure 9B:
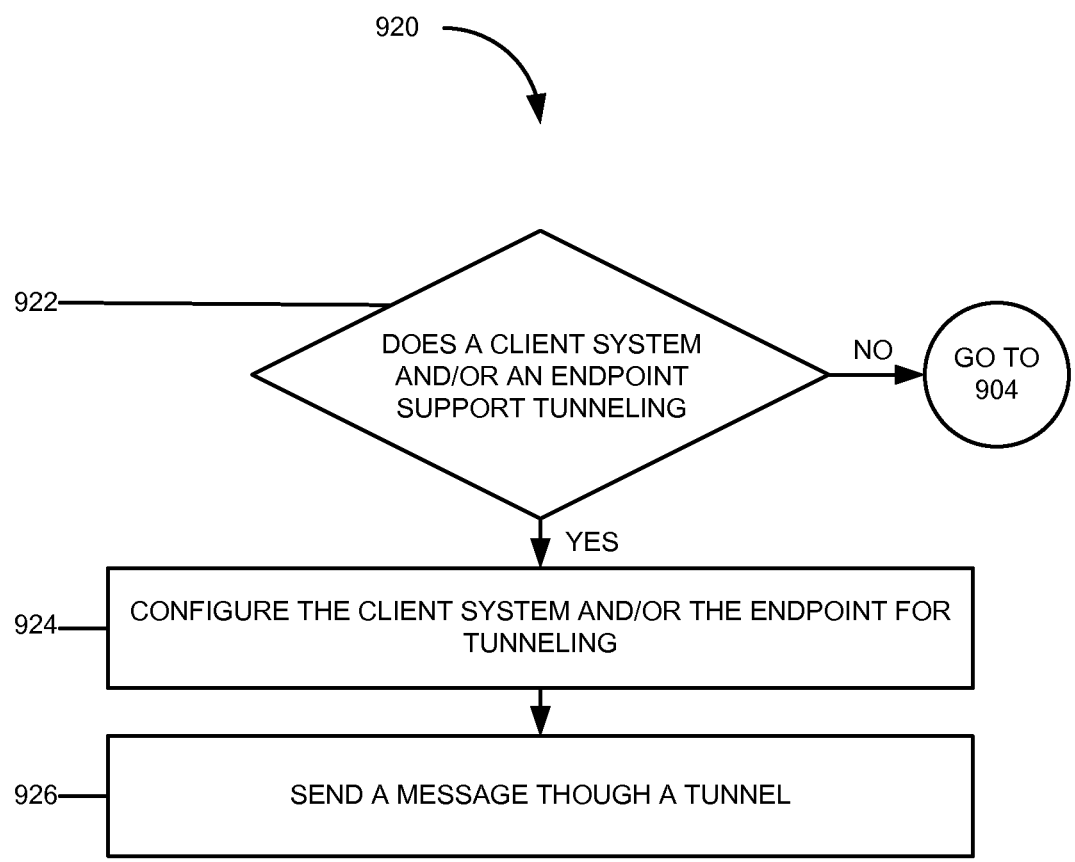

The above paragraphs describe system elements that are related to devices and/or components for sending messages that bypass ALG 406. FIGS. 9A and 9B are flow diagrams of processes that are capable of being performed by one or more of these devices and/or components.

FIG. 9A is a flow diagram of an exemplary process 902 for sending a message that bypasses ALG 406. As shown in FIG. 9A, process 902 may begin at block 904, where client 602 may determine a range of network addresses that ALG 406 does not manage (block 904). In one implementation, client 602 may determine the range of network addresses that ALG 406 does not manage by sending messages that probe ALG 406. Such messages may be received by a device or a server in outside network 204. The device/server in outside network 204 may analyze the messages to determine whether ALG 406 manages ranges of addresses, and may provide client 602 with a range of addresses that ALG 406 does not manage. In a different implementation, a user may determine addresses that ALG 406 does not manage (e.g., by calling a help-desk for information related to ALG 406), and may provide the addresses to client 602 during client 602 configuration.

Client 602 may form a message with a network address that is selected from the range of addresses that ALG 406 does not manage (block 904). When a user uses client 602 (e.g., to place a call via the Internet), client 602 may create and send a series of messages in accordance with a specific communication protocol. For example, in one implementation, client 602 may create a message in accordance with the SIP (e.g., a SIP INVITE message, a SIP REGISTER message, etc.). Furthermore, in creating the message, client 602 may replace each occurrence of a valid source network address with a network address that AGL 406 does not manage. For example, as described above with reference to FIG. 7B, client 602 may substitute a source IP address in FROM field 714 with the IP address that ALG 406 does not manage.

Client 602 may send the message (block 906). In one implementation, the message may be placed in payload 506 of a packet. In another implementation, the message may be partitioned into payloads of several packets.

FIG. 9B is a flow diagram of another exemplary process 920 for sending a message that bypasses ALG 406. At block 922, client 602 may determine if a client system (e.g., a set of components that are hosted on client device 208) and/or an endpoint (e.g., SBC 210) supports tunneling (block 922). For example, client 602 may attempt to tunnel a message to SBC 210, and if client 602 receives an error message, client 602 may determine that SBC 210 and/or the client system do not support tunneling. In a different implementation, a user may indicate to client 602 that the endpoint and/or the client system supports tunneling. If the client system does not supports tunneling, process 920 may proceed to block 904.

Client 602 may configure the client system and/or the endpoint for tunneling (block 924). If the client system and/or the endpoint are already configured, block 924 may be omitted. In a different implementation, a device, such as an auto-configuration server (ACS) may configure the client system and/or the endpoint for tunneling.

Client 602 may send a message via the established tunnel (block 926). When the user uses client 602 for a particular application (e.g., instant messaging, placing an IP phone call, etc.), client 602 may compose a message in accordance with a specific communication protocol (e.g., SIP). Once the message is created, client 602 may send the message. The client system that handles lower level details of communication may then encapsulate the message in a UDP packet as described above in connection with FIG. 8B. The UDP packet may then be sent to the endpoint (e.g., SBC 210). Upon receiving the UDP packet, SBC 210 may de-capsulate and retrieve the message. In process 920, because the message is sent through an IPSec tunnel, the body of the message may not be readable to ALG 406. Consequently, ALG 406 may not modify the message.

Figure 10:
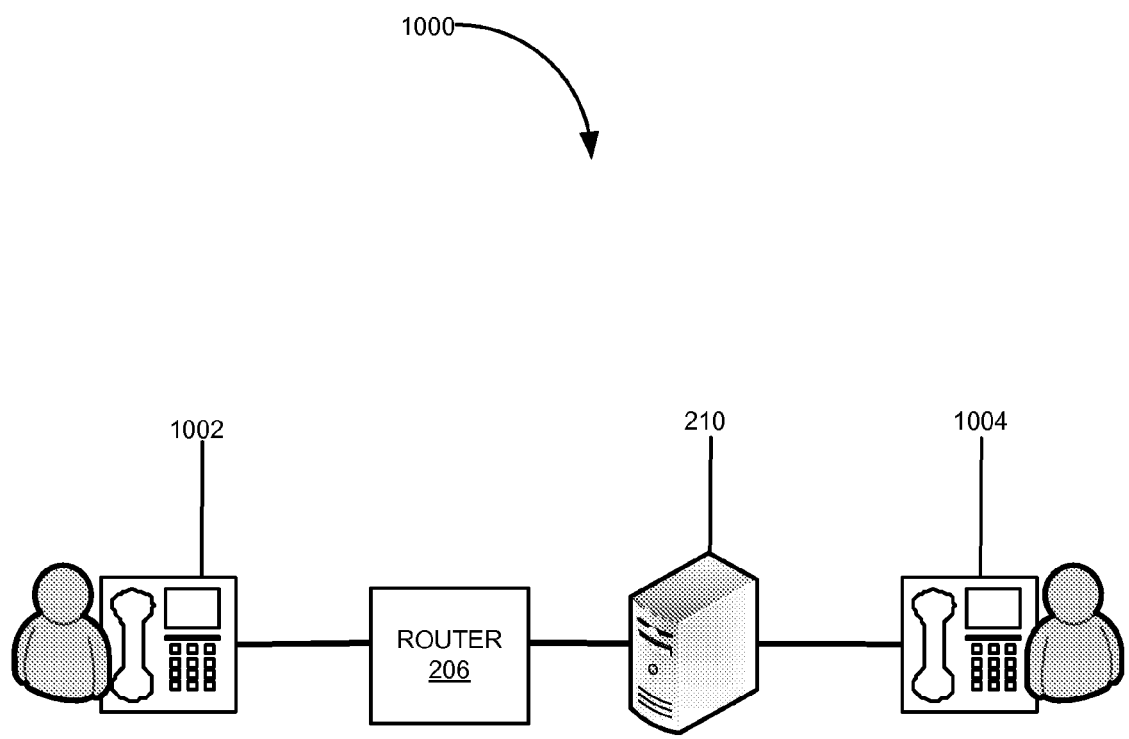
FIG. 10 shows another exemplary network in which the concepts described herein may be implemented.

The following example, with reference to FIG. 10, illustrates a process for sending a message that bypasses ALG 406. The example is consistent with exemplary processes 902 and 920 described above with reference to FIG. 9A and FIG. 9B.

In the example, assume that Carol wishes to call John from her IP phone 1002. In addition, assume that Carol's home network has a router 206 that hosts ALG 406, and that messages from IP phone 1002 are routed to SBC 210.

Carol dials John's number on IP phone 1002. In response, IP phone 1002 composes a SIP INVITE message. Because IP phone 1002 is aware of ALG 406 and IP phone 1002 does not support IPSec tunneling, during the composition of the SIP INVITE message, IP phone 1002 inserts a network address that ALG 406 does not manage in place of IP phone's source address.

When ALG 406 receives the SIP INVITE message, ALG 406 does not alter the network addresses, and consequently, permits the SIP INVITE message to be delivered to SBC 210 unmodified. SBC 210 delivers the SIP INVITE message to John's IP phone 1004. When John's IP phone 1004 rings and John picks up IP phone 1004, John's IP phone 1004 sends SIP 200 OK message to IP phone 1002 via SBC 210.

IP phone 1002 composes a SIP ACK message, with its source IP address replaced with an IP address that ALG 406 does not manage. The SIP ACK message is relayed to IP phone 1004 via SBC 210. Carol begins her conversation with John.

In the above example, by composing messages with sources addresses that ALG 406 does not recognize, IP phone 1002 (e.g., a client) may allow the messages to bypass ALG 406. If both SBC 210 and IP phone 1002 support IPSec tunneling, IP phone 1002 may send messages that bypass ALG by tunneling messages from IP phone 1002 to SBC 210. SBC 210 may de-capsulate the tunneled messages and relay them to IP phone 1004.

The foregoing description of implementations provides illustration, but is not intended to be exhaustive or to limit the implementations to the precise form disclosed. Modifications and variations are possible in light of the above teachings or may be acquired from practice of the teachings.

For example, while a series of blocks has been described with regard to an exemplary process illustrated in FIGS. 9A and 9B, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A computer-readable storage device comprising computer-executable instructions, the computer-executable instructions including:
    instructions for sending, by a client device prior to creating and sending a new message, a probe message to a device to obtain from the device a range of network addresses, any one of which an application layer gateway on a network device will not replace, within the new message when the application layer gateway processing the new message detects the any one of the range of network addresses in the payload of the new message, wherein the new message includes a header and the payload;
    instructions for receiving the range of network addresses from the device;
    instructions for selecting a first network address from the range of network addresses;
    instructions for creating, by the client device, the new message based on a message having a payload that includes a source network address, by replacing the source network address, in the payload of the message, with the first network address, wherein the source network address is incorrectly overwritten with a different address by the application layer gateway when the application layer gateway receives and processes the message; and
    instructions for sending the new message from the client device though the application layer gateway on the network device to a remote device,
    wherein the client device, the network device, and the remote device are different devices.

2. The computer-readable storage device of claim 1, wherein the new message includes one of:
    a session initiation protocol INVITE message;
    a session initiation protocol ACK message; or
    a session initiation protocol REGISTER message.

3. The computer-readable storage device of claim 1, wherein the instructions for sending the new message includes:

instructions for sending the new message from the client device through the application layer gateway to a session border controller that manages voice-over-Internet-Protocol sessions.

4. The computer-readable storage device of claim 1, further comprising:
instructions for sending a message to the remote device through an Internet Protocol Security tunnel when the client device provides a mechanism for establishing the Internet Protocol Security tunnel.

5. The computer-readable storage device of claim 1, wherein the new message includes a user datagram protocol packet.

6. The computer-readable storage device of claim 1, further comprising:
instructions for obtaining a set of addresses that the application layer gateway will not modify, in a message that the application layer gateway receives, when the application layer gateway detects any of the set of addresses in a payload of the message; and
instructions for selecting the first network address from the obtained set of addresses.

7. The computer-readable storage device of claim 1, further comprising:
instructions for determining whether the remote device provides a mechanism for establishing an Internet Protocol Security tunnel.

8. The computer-readable storage device of claim 7, further comprising:
instructions for sending messages through a tunnel when the remote device provides the mechanism for establishing the Internal Protocol Security tunnel.

9. The computer-readable storage device of claim 1, wherein the new message initiates a voice-over-Internet-Protocol call.

10. The computer-readable storage device of claim 1, wherein the application layer gateway includes a session initiation protocol (SIP) application layer gateway.

11. A client device comprising:
a client configured to:
send a probe message to a device to obtain, from the device, a range of network addresses any one of which an application layer gateway hosted on a router will not substitute, in a payload of a new message, with another network address when the application layer gateway receives and processes the new message and recognizes the any one of the network addresses in the payload of the new message;
receive the range of network addresses;
select a first network address from the range of network addresses;
create the new message based on a message having a payload that includes a source network address, by replacing the source network address, in the payload of the message, with the first network address, wherein the source network address is incorrectly overwritten with a different address, by the application layer gateway when the application layer gateway receives and processes the message; and
send the new message from within a private network through the application layer gateway on the router to a remote device outside the private network,
wherein the client device, the router, and the remote device are different devices.

12. The client device of claim 11, wherein the new message includes an Internet Protocol packet.

13. The client device of claim 12, wherein the packet includes:
a user datagram packet.

14. The client device of claim 11, wherein the router includes:
a network address translator.

15. The client device of claim 11, further comprising:
a component to establish an Internet Protocol Security (IPSec) tunnel between the client device and a session border controller that relays the new message to another device.

16. The client device of claim 11, wherein the message includes:
a session initiation protocol (SIP) message.

17. A method comprising:
sending, by a client device prior to creating and sending a new message, a probe message to a device to obtain from the device a range of network addresses, any one of which an application layer gateway on a network device will not replace, within the new message when the application layer gateway processing the new message detects the any one of the range of network addresses in the payload of the new message, wherein the new message includes a header and the payload;
receiving the range of network addresses from the device;
selecting a first network address from the range of network addresses;
creating, by the client device, the new message based on a message having a payload that includes a source network address, by replacing the source network address, in the payload of the message, with the first network address, wherein the source network address is incorrectly overwritten with a different address by the application layer gateway when the application layer gateway receives and processes the message; and
sending the new message from the client device though the application layer gateway on the network device to a remote device,
wherein the client device, the network device, and the remote device are different devices.

18. The method of claim 17, wherein sending the new message includes:
sending the new message from the client device through the application layer gateway to a session border controller that manages voice-over-Internet-Protocol sessions.

19. The method of claim 17, further comprising:
sending a message to the remote device through an Internet Protocol Security tunnel when the client device provides a mechanism for establishing the Internet Protocol Security tunnel.

20. The method of claim 17, wherein the new message includes a user datagram protocol packet.

* * * * *